United States Patent
Su et al.

(10) Patent No.: US 11,737,104 B2
(45) Date of Patent: Aug. 22, 2023

(54) METHOD AND DEVICE FOR MULTIPLE INPUT MULTIPLE OUTPUT COMMUNICATIONS

(71) Applicants: Alcatel Lucent, Nozay (FR); Nokia Solutions and Networks Oy, Espoo (FI)

(72) Inventors: Ling Su, Beijing (CN); Min Zhang, Swindon (GB); Xiaoyi Wang, Hoffman Estates, IL (US); Frank Hsieh, Hoffman Estates, IL (US)

(73) Assignees: NOKIA SOLUTIONS AND NETWORKS OY, Espoo (FI); ALCATEL LUCENT, Nozay (FR)

(*) Notice: Subject to any disclaimer, the term of this patent is extended or adjusted under 35 U.S.C. 154(b) by 222 days.

(21) Appl. No.: 16/325,157

(22) PCT Filed: Jul. 26, 2017

(86) PCT No.: PCT/IB2017/001083
§ 371 (c)(1),
(2) Date: Feb. 12, 2019

(87) PCT Pub. No.: WO2018/029526
PCT Pub. Date: Feb. 15, 2018

(65) Prior Publication Data
US 2021/0289531 A1    Sep. 16, 2021

(30) Foreign Application Priority Data

Aug. 12, 2016 (CN) .......................... 201610665087.3

(51) Int. Cl.
*H04W 72/23* (2023.01)
*H04B 7/0452* (2017.01)
(Continued)

(52) U.S. Cl.
CPC .......... *H04W 72/23* (2023.01); *H04B 7/0452* (2013.01); *H04L 27/261* (2013.01); *H04J 13/0062* (2013.01)

(58) Field of Classification Search
CPC .................................................... H04J 13/0062
(Continued)

(56) References Cited

U.S. PATENT DOCUMENTS 9,374,833 B2 * 6/2016 Noh .................. H04W 72/23
10,355,759 B2   7/2019 Nayeb Nazar et al.
(Continued)

FOREIGN PATENT DOCUMENTS

CN     102143096 A    8/2011
CN     102215571 A    10/2011
(Continued)

OTHER PUBLICATIONS

Qualcomm Incorporated, "Performance evaluation of uplink DMRS enhancements for MU-MIMO," 3rd Generation Partnership Project (3GPP), 3GPP TSG-RAN WG1 #85, R1-164429, pp. 1-5, XP051096450, Nanjing, China, May 23-27, 2016.
(Continued)

*Primary Examiner* — Jeffrey M Rutkowski
*Assistant Examiner* — Luna Weissberger
(74) *Attorney, Agent, or Firm* — Lippes Mathias LLP (57) ABSTRACT

Embodiments of the present disclosure provide a method for multiple input multiple output (MIMO) communications. For example, scheduling information is received at a terminal device from a network device, the scheduling information at least indicates physical resource blocks shared by a demodulation reference signal (DMRS) of the terminal device and a further DMRS of at least one further terminal device, and different sub-carriers allocated to the DMRS and the further DMRS in each of physical resource blocks, and
(Continued)

the number of physical resource blocks is indivisible by a total number of the terminal device and the at least one further terminal device. The DMRS is generated, and a length of the DMRS is determined based on the number of physical resource blocks and the number of at least one further terminal device. The DMRS is transmitted to the network device on the sub-carriers allocated to the DMRS in the physical resource blocks. A corresponding method implemented at a network device such as a base station, and a terminal device and network device capable of implementing the above methods are also disclosed.

15 Claims, 3 Drawing Sheets

(51) Int. Cl.
  *H04L 27/26* (2006.01)
  *H04J 13/00* (2011.01)
(58) Field of Classification Search
  USPC .......................................................... 370/329
  See application file for complete search history.

(56) References Cited

U.S. PATENT DOCUMENTS

| | | | | |
|---|---|---|---|---|
| 2009/0094651 | A1* | 4/2009 | Damm | ............... H04N 21/6405 |
| | | | | 725/110 |
| 2011/0128909 | A1 | 6/2011 | Luo et al. | |
| 2012/0281656 | A1 | 11/2012 | Hooli et al. | |
| 2013/0039332 | A1* | 2/2013 | Nazar | .................. H04B 7/0452 |
| | | | | 370/330 |
| 2013/0142150 | A1 | 6/2013 | Zhou et al. | |
| 2014/0036850 | A1 | 2/2014 | Akimoto et al. | |
| 2014/0369286 | A1 | 12/2014 | Noh et al. | |
| 2015/0124663 | A1 | 5/2015 | Chen et al. | |
| 2015/0263796 | A1 | 9/2015 | Nam et al. | |
| 2015/0304995 | A1 | 10/2015 | Yi et al. | |
| 2015/0305059 | A1 | 10/2015 | Li et al. | |
| 2017/0289924 | A1* | 10/2017 | Fu | ......................... H04L 5/0051 |

FOREIGN PATENT DOCUMENTS

| | | | |
|---|---|---|---|
| CN | 102395163 A | | 3/2012 |
| CN | 102740480 A | * | 10/2012 |
| CN | 103733539 A | | 4/2014 |
| CN | 103795509 A | | 5/2014 |
| CN | 104782067 A | | 7/2015 |
| CN | 105706484 A | | 6/2016 |
| JP | 2012-222722 A | | 11/2012 |
| JP | 2013-509830 A | | 3/2013 |
| JP | 2013-516874 A | | 5/2013 |
| KR | 2015-0107688 | | 9/2015 |
| WO | WO 2013/073832 A1 | | 5/2013 |
| WO | WO 2017/171452 A1 | | 10/2017 |

OTHER PUBLICATIONS

Intel Corporation, "NB-IoT Uplink Shared Channel Design," 3$^{rd}$ Generation Partnership Project (3GPP), 3GPP TSG RAN WG1 NB-IoT Ad-Hoc Meeting, R1-160131, 9 pages, XP051053450, Budapest, Hungary, Jan. 18-20, 2016.
International Search Report for PCT/IB2017/001083 dated Nov. 10, 2017.
Intel Corporation, Discussion on UL DMRS Enhancement for FD-MIMO, 3GPP TSG RAN WG1 #85, R1-164144, Nanjing, China, May 23-27, 2016, pp. 1-6.
CATT, "Design of sPUSXH DMRS," 3GPP TSG RAN WG1 #85, R1-164234, Nanjing, China, May 23-27, 2016, 4 pages.

* cited by examiner

METHOD AND DEVICE FOR MULTIPLE INPUT MULTIPLE OUTPUT COMMUNICATIONS

FIELD

Embodiments of the present disclosure generally relate to a technology of communications, and more specifically, to a method for multiple input multiple output (MIMO) communications and a corresponding terminal device and network device.

BACKGROUND

At present, a multi-user multiple input multiple output (MU-MIMO) technology has been proposed for a long term evolution (LTE) system. The MU-MIMO technology involves allocation of partially overlapping bandwidths or resources to a plurality of terminal devices, and therefore it is further desired to use a technology of Interleaved Frequency Division Multiple Access (IFDMA) in the MU-MIMO to multiplex uplink signals from the plurality of terminal devices. However, a drawback of using the IFDMA is that it poses limitations on resource scheduling of a base station or an eNodeB in the LTE system. For example, the number of physical resource blocks (PRBs) for transmitting data on a physical uplink shared channel (PUSCH) is limited.

SUMMARY

In general, embodiments of the present disclosure provide a method for multiple input multiple output (MIMO) communications and a corresponding terminal device and network device.

In a first aspect, embodiments of the present disclosure provide a method for multiple input multiple output (MIMO) communications. The method comprises: receiving, at a terminal device, scheduling information from a network device, the scheduling information at least indicating physical resource blocks shared by a demodulation reference signal (DMRS) of the terminal device and a further DMRS of at least one further terminal device, and different sub-carriers allocated to the DMRS and the further DMRS in each of the physical resource blocks, the number of physical resource blocks being indivisible by a total number of the terminal device and the at least one further terminal device; generating the DMRS, a length of the DMRS being determined based on the number of physical resource blocks and the number of at least one further terminal device; and transmitting the DMRS to the network device on the sub-carriers allocated to the DMRS in the physical resource blocks.

In a second aspect, embodiments of the present disclosure provide a method for multiple input multiple output (MIMO) communications. The method comprises: generating scheduling information, the scheduling information at least indicating physical resource blocks shared by a plurality of demodulation reference signals (DMRSs) of a plurality of terminal devices, and different sub-carriers allocated to the plurality of DMRSs in each of physical resource blocks, the number of the physical resource blocks being indivisible by a total number of the plurality of terminal devices; transmitting the scheduling information to the plurality of terminal devices; receiving the plurality of DMRSs from the plurality of terminal devices on the sub-carriers respectively allocated to the plurality of DMRSs in the physical resource blocks, lengths of the DMRSs being determined based on the number of physical resource blocks and the number of the plurality of terminal devices.

In a third aspect, embodiments of the present disclosure provide a terminal device. The terminal device comprises: a transceiver configured to receive scheduling information from a network device, the scheduling information at least indicating physical resource blocks shared by a demodulation reference signal (DMRS) of the terminal device and a further DMRS of at least one further terminal device, and different sub-carriers allocated to the DMRS and the further DMRS in each of the physical resource blocks, the number of physical resource blocks being indivisible by a total number of the terminal device and at least one further terminal device; a controller configured to generate the DMRS, a length of the DMRS being determined by the number of physical resource blocks and the number of at least one further terminal device; and the transceiver being further configured to transmit the DMRS to the network device on the sub-carriers allocated to the DMRS in the physical resource blocks.

In a fourth aspect, embodiments of the present disclosure provide a network device. The network device comprises: a controller configured to generate scheduling information, the scheduling information at least indicating physical resource blocks shared by a plurality of demodulation reference signals (DMRSs) of a plurality of terminal devices, and different sub-carriers allocated to the plurality of DMRSs in each of the physical resource blocks, the number of the physical resource blocks being indivisible by a total number of the plurality of terminal devices; a transceiver configured to: transmit the scheduling information to the plurality of terminal devices, and receive the plurality of DMRSs from the plurality of terminal devices on the sub-carriers respectively allocated to the plurality of DMRSs in the physical resource blocks, lengths of the DMRSs being determined based on the number of physical resource blocks and the number of the plurality of terminal devices.

Through the following description, it is to be understood that according to the embodiments of the present disclosure, by designing DMRSs based on lengths required for different DMRSs to be transmitted by the terminal devices to the network device in uplink, IFDMA multiplexing of data (for example, including the DMRSs) transmitted from the plurality of terminal devices on a PUSCH channel is implemented for adaptation to the MU-MIMO technology. Meanwhile, it is allowed to transmit data using any number of physical resource blocks on the PUSCH channel so as to eliminate such a limitation on the resource scheduling when the IFDMA is adopted in a MU-MIMO system as allocating to the terminal device only the physical resource blocks having a number which is an integral multiple of the number of terminal devices, that is, which is divisible by the number of the terminal devices. Therefore, bandwidths or the number of physical resource blocks used by the terminal devices on the PUSCH channel may be more flexible in the case where the IFDMA is employed.

It is to be appreciated that contents described in this Summary are not intended to identify key or essential features of the embodiments of the present disclosure, or limit the scope of the present disclosure. Other features of the present disclosure will become easily comprehensible through the following description.

BRIEF DESCRIPTION OF THE DRAWINGS

Through the following detailed description and with reference to the accompanying drawings, the above and other features, advantages and aspects of various embodiments of the present disclosure will become more apparent. In the drawings, same or similar reference signs represent the same or similar elements, wherein.

In all drawings, same or similar reference numbers represent the same or similar elements.

DETAILED DESCRIPTION

Embodiments of the present disclosure will be described in more details with reference to the drawings. Although the drawings show some embodiments of the present disclosure, it is to be understood that the present disclosure may be implemented in various manners and should not be construed as being limited to the embodiments explained herein. On the contrary, the embodiments are provided for a more thorough and complete understanding of the present disclosure. It is to be understood that the drawings and embodiments of the present disclosure are only for the purpose of illustration, without suggesting any limitations on the protection scope of the present disclosure.

As used herein, the term "network device" refers to a base station or other entities or nodes having a particular function in a communication network. The term "base station" (BS) may represent a node B (NodeB or NB), an evolution node B (eNode B or eNB), a remote radio unit (RRU), a radio frequency head (RH), a remote radio head (RRH), a relay, or a low power node, such as a picocell or a femtocell, or the like. In the context of the present disclosure, the terms "network device" and "base station" are used interchangeably for the sake of discussion, and the eNB mainly serves as an example of the network device.

As used herein, the term "terminal device" or "user equipment" (UE) refers to any terminal devices capable of wireless communications with each other or with the base station. As an example, the terminal device may comprise a mobile terminal (MT), a subscriber station (SS), a portable subscriber station (PSS), a mobile station (MS) or an access terminal (AT), and the above devices mounted on a vehicle. In the context of the present disclosure, the terms "terminal device" and "user equipment" are used interchangeably for the sake of discussion.

As used herein, the term "demodulation reference signal" (DMRS) refers to a pilot signal in signals transmitted by the terminal device to the network device over the PUSCH channel, which is used at the network device for channel estimation for the terminal device, for example. The DMRS may be located on a symbol of a resource block.

As used herein, the term "includes" and its variants are to be read as open terms that mean "includes, but is not limited to". The term "based on" is to be read as "based at least in part on". The term "one embodiment" is to be read as "at least one embodiment". The term "a further embodiment" is to be read as "at least one further embodiment". Definitions related to other terms will be presented in the following description.

As described above, in current 3GPP standardizations, for example, in LTE Release 14, the MU-MIMO technology has been proposed for the LTE. In the MU-MIMO, since a plurality of user equipment (UEs) may share bandwidths or physical resource blocks in uplink, for example, on the PUSCH channel, it is desired to multiplex the uplink signals from the plurality of UEs in an interleaved approach.

When the uplink signals are multiplexed with such a technology as the IFDMA, the number of physical resource blocks (PRBs) allocated by the base station to the plurality of UEs in the LTE system has to be an integral multiple of the repetition factor (RPF, which is the number of UEs, for example), that is, has to be divisible by the repetition factor. For instance, in the case of the MU-MIMO, when the repetition factor is 2, an odd number of physical resource blocks cannot be allocated to the UEs.

Through research of the inventor, it is found that this problem is resulted from design issues of the DMRS signals transmitted on the PUSCH channel. In order to at least in part solve the problem, embodiments of the present disclosure provide a novel designing and utilization solution of a DMRS sequence.

Embodiments of the present disclosure provide a method for multiple input multiple output (MIMO) communications. The method comprises: receiving, at a terminal device, scheduling information from a network device, the scheduling information at least indicating physical resource blocks shared by the terminal device and at least one further terminal device, the number of physical resource blocks being indivisible by a total number of the terminal devices; generating a demodulation reference signal (DMRS), a length of the DMRS being determined based on the number of physical resource blocks and the number of at least one further terminal device; and transmitting the DMRS to the network device on sub-carriers allocated to the terminal device in the physical resource blocks.

Figure 1:
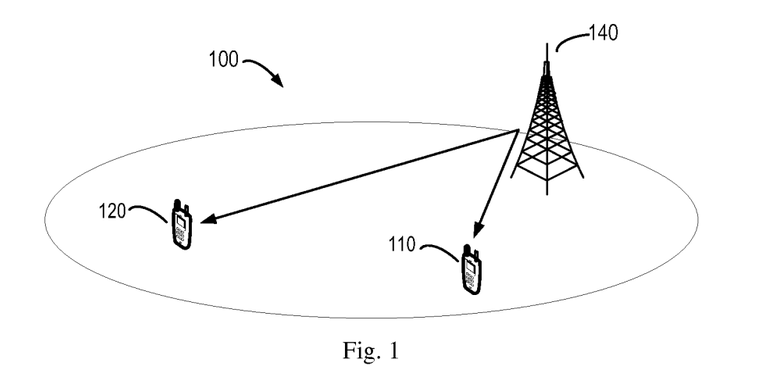
FIG. 1 illustrates an example communication network in which embodiments of the present disclosure can be implemented.

FIG. 1 shows an example communication network 100 in which embodiments of the present disclosure can be implemented. The communication network 100 comprises a network device 140 and a plurality of terminal devices, such as, a first terminal device 110 and a second terminal device 120. The network device 140 may communicate with the two terminal devices 110 and 120. Accordingly, the two terminal devices 110 and 120 may communicate with each other via the network device 140. It is to be understood that the numbers of network devices and terminal devices as shown in FIG. 1 is only for the purpose of illustration, without suggesting any limitations. The network 100 may comprise any suitable numbers of network devices and terminal devices.

The communications in the network 100 may be implemented according to any suitable communication protocol, including but not limited to, cellular communication protocols of the first generation (1G), the second generation (2G), the third generation (3G), the fourth generation (4G), the fifth generation (5G), and the like, wireless local network communication protocols, such as Institute of Electrical and Electronic Engineers (IEEE) 802.11 and the like, and/or any other protocols currently known or to be developed in the future. Furthermore, the communications use any suitable wireless communication technology, including but not limited to, code division multiple access (CDMA), frequency division multiple access (FDMA), time division multiple access (TDMA), frequency division duplex (FDD), time division duplex (TDD), multiple input multiple output (MIMO) or multi-user multiple input multiple output (MU-MIMO), orthogonal frequency division multiple access (OFDMA), and/or any other technologies currently known or to be developed in the future.

According to embodiments of the present disclosure, by using a newly designed DMRS sequence, when the terminal devices 110 and 120 multiplex the uplink signals transmitted by the terminal devices 110 and 120 with the IFDMA, the number of physical resource blocks used by the terminal devices 110 and 120 on the uplink PUSCH channel is more flexible.

Figure 2:
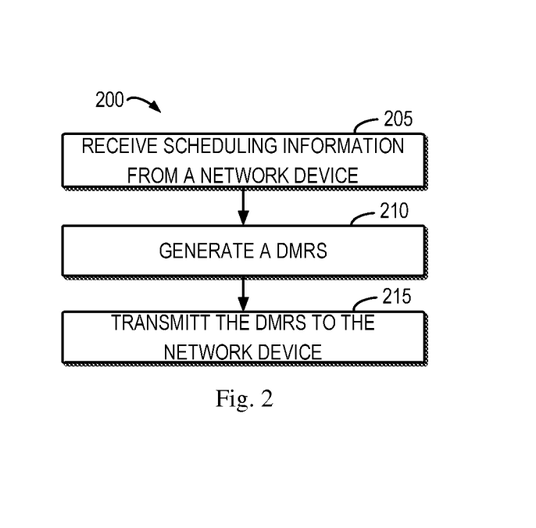
FIG. 2 illustrates a flow chart of an example method according to some embodiments of the present disclosure.
Figure 3:
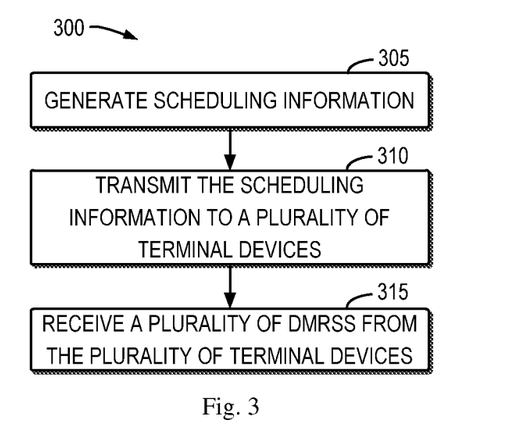
FIG. 3 illustrates a flow chart of an example method according to some other embodiments of the present disclosure.

Principles and specific embodiments of the present disclosure will be described in details with reference to FIGS. 2 and 3 from the perspective of the first terminal device 110 and the network device 140, respectively. Reference is first made to FIG. 2 which shows a flowchart of an example method 200 according to some embodiments of the present disclosure. It is to be understood that the method 200 can be implemented at the first terminal device 110 as shown in FIG. 1, and a method 300 can be implemented at the network device 140 as shown in FIG. 1. For the purpose of discussion, the method 200 will be described below with reference to FIG. 1.

As shown in FIG. 2, at 205, scheduling information is received at the terminal device 110 from the network device 140. In one embodiment, in the MU-MIMO communications for the LTE, the network device 140 may transmit to the first terminal device 110 over a physical downlink control channel (PDCCH) the corresponding scheduling information for resource scheduling, for example. The scheduling information may be for example downlink control information (DCI).

According to embodiments of the present disclosure, the scheduling information at least indicates physical resource blocks shared by the DMRS of the first terminal device 110 and a further DMRS of, for example, the second terminal device 120 (or other DMRSs of more terminal devices), and different sub-carriers allocated to the DMRS and the further DMRS in each of the physical resource blocks. The physical resource block may define time and frequencies available for the transmission of the DMRSs of the above terminal devices 110 and 120 in uplink over the PUSCH channel. Code division multiplexing of the DMRSs of the above terminal devices 110 and 120 may be performed using the same OCC codes. The number of physical resource blocks may be indivisible by a total number of the terminal device 110 and at least one further terminal device 120. In other words, the number of physical resource blocks is not an integral multiple of the total number of the terminal device 110 and at least one further terminal device 120.

At 210, a demodulation reference signal (DMRS) is generated, and the length of the DMRS is determined based on the number of physical resource blocks and the number of at least one further terminal device 120. In one embodiment, in response to receiving the scheduling information, the terminal device 110 generates data to be transmitted on physical resource blocks or sub-carriers allocated to the DMRS of the terminal device on the PUSCH channel, for example. The data comprises a demodulation reference signal (DMRS), which is a pilot signal used for channel estimation at a network device side, for example. The DMRS may be transmitted on a particular symbol (for example, the fourth symbol) of the physical resource block. The DMRS from the terminal device 110 and the DMRS from the at least one further terminal device 120 may form an interleaved signal based on the allocation of the resources or sub-carriers by the network device 140 in the physical resource blocks.

In some embodiments, the method 200 may also comprise: determining the number of sub-carriers associated with the physical resource blocks. Then, the length of the DMRS is determined to be proportional to the number of sub-carriers and the number of physical resource blocks and inversely proportional to the number of at least one further terminal device 120.

Specifically, in one embodiment, in the case where the IFDMA is employed, the length of the interleaved signal is proportional to the number of the sub-carriers and the number of shared physical resource blocks, for example. Similar to the conventional DMRS, a length of the interleaved signal may be an integral multiple of the number of sub-carriers associated with one physical resource block, for example, 24. According to one embodiment, a sequence for the DMRS signals may be selected from a sequence table in LTE specifications.

According to a conventional DMRS design, the sequence table in the LTE specifications specifies sequences with a length of 12 which is the smallest unit of a DMRS length. Based on the conventional sequence table in the LTE specifications, the length of the DMRS of the terminal 110 is equal to an integral multiple of the number of sub-carriers associated with one physical resource block, for example, 12, 24, and the like, and the length of the interleaved signal has to be an even multiple of the sub-carriers, accordingly. In this case, according to the above descriptions related to the resource scheduling, the number of resource blocks allocated to the terminal device and corresponding to the sub-carriers is an integral multiple of the number of sub-carriers associated with one physical resource block, accordingly. This forms limitations on the resource scheduling at a network device side and resource usage at a terminal device side.

The DMRS design according to embodiments of the present disclosure may effectively solve the above problem. First, a case is considered where the repetition factor (or the number of terminal devices) is 2, which is, for example, the case where the two terminal devices 110 and 120 are present as in FIG. 1. The terminal devices 110 and 120 share one or more physical resource blocks. When one physical resource block is shared, the DMRS length for each of the terminal devices 110 and 120 is 6, for instance. When the number of shared physical resource blocks is an odd, such as 3, 5, 7, 9, and the like, the DMRS length for each of the terminal devices 110 and 120 is, for example, 18, 30, 42 and 54. For example, the DMRS length is determined by first multiplying an integral multiple of the number of sub-carriers associated with one physical resource block by the number of shared physical resource blocks and then being divided by the RPF, as shown in the following table:

TABLE 1

| The number of PRBs for the interleaved signal | The DMRS length when RPF = 2 |
| --- | --- |
| 1 | 6 |
| 3 | 18 |
| 5 | 30 |
| 7 | 42 |
| 9 | 54 |

To this end, according to embodiments of the present disclosure, by taking a length-6 DMRS as an example, a "6-tone" DMRS sequence table employed in R13 NB-IoT WI specifications for Internet of things may be used, which includes fourteen length-6 DMRS sequences. For a further DMRS with a length of n (n>12), a new DMRS sequence may be generated for the IFDMA by concatenating a plurality of conventional DMRS sequences. According to embodiments of the present disclosure, the new DMRS sequence may be generated by concatenating a conventional Rel. 8 DMRS sequence and a 6-tone DMRS sequence. As an instance, a length-18 DMRS sequence is generated by concatenating a length-12 DMRS sequence and the above length-6 DMRS sequence. According to embodiments of the present disclosure, a DMRS sequence seed for the 6-tone DMRS sequence may be configured separately from a conventional DMRS virtual cell identifier (VCID). In order to determine the virtual cell identifier for generating the DMRS sequence, the virtual cell identifier $n_{ID}^{PUSCH}$ is configured separately for the conventional DMRS and the 6-tone DMRS on a layer higher than, for example, a physical layer. According to embodiments of the present disclosure, when a cyclic shift is applied to the DMRS, the cyclic shift may be independently applied to the conventional DMRS and the 6-tone DMRS. It is to note that a new 6-bit sequence may be designed for truncating.

According to another embodiment, a new DMRS sequence may be generated by truncating various DMRS sequences. According to embodiments of the present disclosure, a DMRS sequence with a length of n+6 may be generated by truncating the conventional DMRS sequence. For example, regarding a group of 30 conventional DMRS sequences in the sequence table, from the sequences, for example, φ(0), . . . , φ(23), any six values, such as φ(0), φ(1), φ(2), φ(3), φ(4), φ(5), as shown in Table 2, may be truncated.

TABLE 2

| Number | φ'(0), φ'(1), φ'(2), φ'(3), φ'(4), φ'(5), | | | | | |
|---|---|---|---|---|---|---|
| 0 | 1 | 1 | 1 | 1 | 3 | −3 |
| ~~1~~ | ~~1~~ | ~~1~~ | ~~1~~ | ~~−3~~ | ~~−3~~ | ~~3~~ |
| 2 | 1 | 1 | 3 | 1 | −3 | 3 |
| 3 | 1 | −1 | −1 | −1 | 1 | −3 |
| 4 | 1 | −1 | 3 | −3 | −1 | −1 |

TABLE 2-continued

| Number | φ'(0), φ'(1), φ'(2), φ'(3), φ'(4), φ'(5), | | | | | |
|---|---|---|---|---|---|---|
| 5 | 1 | 3 | 1 | −1 | −1 | 3 |
| 6 | 1 | −3 | −3 | 1 | 3 | 1 |
| 7 | −1 | −1 | 1 | −3 | −3 | −1 |
| 8 | −1 | −1 | −1 | 3 | −3 | −1 |
| 9 | 3 | −1 | 1 | −3 | −3 | 3 |
| 10 | 3 | −1 | 3 | −3 | −1 | 1 |
| ~~11~~ | ~~3~~ | ~~3~~ | ~~−3~~ | ~~−3~~ | ~~−3~~ | ~~−1~~ |
| 12 | 3 | −3 | 3 | −1 | 3 | 3 |
| 13 | −3 | 1 | 3 | 1 | −3 | −1 |
| 14 | −3 | 1 | −3 | 3 | −3 | −1 |
| 15 | −3 | 3 | −3 | 1 | 1 | −3 |

Some of the DMRS sequences generated by the truncation are φ(0), . . . , φ(17) or φ(1), . . . , φ(18) for example. As another example, a conventional length-36 DMRS sequence may be truncated to generate the DMRS sequence. For example, the truncating is implemented from the sequence table 5.5.1.1 in the LTE specifications.

In some embodiments, generating the DMRS at step 210 may comprise: generating the DMRS by truncating a Zadoff-Chu sequence based on the length. For example, according to one embodiment, the DMRS may be generated by truncating the Zadoff-Chu sequence based on a required DMRS length to generate the DMRS. For instance, the length of the Zadoff-Chu sequence is $N_{ZC}^{RS}$, which is the minimum prime number greater than $M_{sc}^{RS}$ that represents the required DMRS length. As an example, a length-19 Zadoff-Chu sequence may be truncated to generate a length-18 DMRS sequence. As another example, a length-31 Zadoff-Chu sequence may be truncated to generate a length-30 DMRS sequence. In one example embodiment, the length-30 sequence may be obtained by truncating any length-31 Zadoff-Chu sequence. It is discovered through the experiments that by truncating the first or the thirty-one element of the length-30 Zadoff-Chu sequence, a group of 30 basic sequences has a maximum cross-correlation lower than that of the conventional length-36 DMRS sequence and has a maximum CM (cubic metric) value which is below that of the length-30 DMRS. An example of the group of 30 basic sequences is as follows. For example, 4^18 QPSK sequences are available for a length-18 sequence. The group of 30 QPSK DMRS sequences is selected with the lowest maximum CM value and cross-correlation.

TABLE 3

| u | φ(0), . . . , φ(17) | | | | | | | | | | | | | | | | | |
|---|---|---|---|---|---|---|---|---|---|---|---|---|---|---|---|---|---|---|
| 0 | −3 | −3 | −3 | −3 | −3 | −3 | 1 | −1 | 3 | 3 | 1 | −3 | −1 | −1 | 3 | 1 | −3 | −1 |
| 1 | −3 | −3 | −3 | −3 | −3 | −3 | 1 | 1 | −3 | −3 | 1 | −1 | 3 | 3 | −1 | 3 | −1 | 3 |
| 2 | −3 | −3 | −3 | −3 | −3 | −3 | 1 | 1 | −1 | −1 | 3 | 3 | −3 | −1 | 1 | −3 | 1 | −3 |
| 3 | −3 | −3 | −3 | −3 | −3 | −3 | 1 | 3 | −1 | −3 | −3 | 1 | 1 | −3 | 3 | −1 | 3 | 1 |
| 4 | −3 | −3 | −3 | −3 | −3 | −3 | 3 | −3 | 1 | 1 | −3 | −1 | 3 | 1 | −3 | −3 | 1 | −1 |
| 5 | −3 | −3 | −3 | −3 | −3 | −1 | −3 | −3 | 1 | 3 | −1 | 3 | 1 | −3 | −1 | −1 | 1 | 3 |
| 6 | −3 | −3 | −3 | −3 | −3 | −1 | −3 | −1 | 3 | 1 | 3 | −1 | −1 | 3 | −1 | −3 | 3 | 1 |
| 7 | −3 | −3 | −3 | −3 | −3 | −1 | −1 | 1 | −3 | 3 | −3 | 1 | 1 | −1 | −3 | 1 | −1 | −3 |
| 8 | −3 | −3 | −3 | −3 | −3 | −1 | 3 | −3 | −1 | −1 | 1 | −3 | 3 | 3 | 1 | −1 | −3 | 1 |
| 9 | −3 | −3 | −3 | −3 | −3 | 1 | −3 | 1 | 3 | 1 | −1 | −3 | −3 | 1 | 1 | 3 | −1 | −1 |
| 10 | −3 | −3 | −3 | −3 | −3 | 1 | −1 | −3 | 1 | −1 | 3 | 3 | −1 | 3 | −3 | −3 | −3 | 3 |
| 11 | −3 | −3 | −3 | −3 | −3 | 1 | 3 | 3 | −3 | −1 | 3 | 1 | −1 | −3 | −1 | 3 | 1 | −1 |
| 12 | −3 | −3 | −3 | −3 | 3 | −1 | −1 | 1 | −1 | −3 | 3 | −3 | 1 | −1 | 3 | −3 | 1 | 1 |
| 13 | −3 | −3 | −3 | −3 | −1 | −3 | −3 | 3 | 1 | −3 | −1 | 1 | −3 | 3 | −3 | 1 | 1 | −3 |
| 14 | −3 | −3 | −3 | −3 | −1 | −3 | −1 | −3 | 3 | −1 | 3 | −1 | 1 | 3 | 3 | −1 | −1 | −3 |
| 15 | −3 | −3 | −3 | −3 | −1 | −3 | 3 | −3 | −3 | 3 | 3 | −1 | 1 | −3 | −1 | −3 | 1 | −3 |
| 16 | −3 | −3 | −3 | −3 | −1 | −1 | −3 | 3 | 3 | −1 | 1 | 3 | −1 | −1 | 3 | −3 | −1 | 3 |
| 17 | −3 | −3 | −3 | −3 | −1 | −1 | 3 | −1 | −3 | 1 | 3 | −3 | 1 | −3 | 3 | 3 | 1 | −1 |
| 18 | −3 | −3 | −3 | −3 | −1 | 1 | −3 | 3 | 3 | 1 | −3 | 3 | 1 | −1 | −1 | 3 | −3 | |
| 19 | −3 | −3 | −3 | −3 | −1 | 3 | −1 | 1 | −3 | −3 | 1 | 1 | −3 | −3 | 1 | −3 | 3 | −1 |
| 20 | −3 | −3 | −3 | −3 | −1 | 3 | 3 | −3 | −1 | 3 | −1 | −1 | −3 | 1 | 3 | 1 | −3 | 3 |
| 21 | −3 | −3 | −3 | −3 | 1 | −1 | −1 | 3 | 1 | −3 | 3 | −3 | 1 | 1 | 1 | −3 | −1 | 1 |

TABLE 3-continued

| u | $\varphi(0), \ldots, \varphi(17)$ | | | | | | | | | | | | | | | | | |
|---|---|---|---|---|---|---|---|---|---|---|---|---|---|---|---|---|---|---|
| 22 | −3 | −3 | −3 | −3 | 1 | −1 | 1 | −3 | 3 | 1 | −1 | −3 | 3 | −3 | −3 | 1 | 3 | −3 |
| 23 | −3 | −3 | −3 | −3 | 1 | 1 | −1 | 1 | 1 | −1 | 3 | −1 | 3 | −1 | −1 | 1 | 3 | −1 |
| 24 | −3 | −3 | −3 | −3 | 1 | 1 | 3 | −1 | −3 | 3 | −3 | −1 | −1 | −3 | 1 | −3 | −1 | 3 |
| 25 | −3 | −3 | −3 | −3 | 3 | 3 | −1 | −3 | −3 | 1 | −3 | −3 | −1 | 3 | −1 | 1 | 1 | 3 |
| 26 | −3 | −3 | −3 | −1 | −3 | −3 | −3 | −1 | 1 | −3 | 3 | 1 | 3 | −1 | 1 | −1 | −3 | 3 |
| 27 | −3 | −3 | −3 | −1 | −3 | −1 | 1 | −3 | −3 | 3 | 3 | 1 | −3 | 1 | −1 | 3 | 3 | −1 |
| 28 | −3 | −3 | −3 | −1 | −3 | 3 | 3 | 1 | 1 | 1 | −3 | 3 | −1 | 3 | 3 | −1 | −3 | −3 |
| 29 | −3 | −3 | −3 | −1 | −1 | −3 | 1 | −3 | 1 | −1 | −1 | 3 | 3 | −3 | 1 | 3 | −1 | −1 |

In some embodiments, generating the DMRS at step 210 may comprise: generating the DMRS by truncating a further DMRS based on the length and cyclically extending the truncated further DMRS. In one embodiment, the DMRS is generated, for example, by truncating the further DMRS based on the required DMRS length and cyclically extending the truncated further DMRS. As an example, a conventional DMRS sequence with a length of 12 is truncated to generate a DMRS sequence with a length of 6, and the DMRS with the length of 6 is cyclically extended to generate a DMRS sequence with a length of 18. As another example, a conventional length-24 DMRS sequence may be truncated and the truncated DMRS sequence may be cyclically extended, to generate the length-30 DMRS sequence.

In some embodiments, generating the DMRS at step 210 may comprise: generating the DMRS by cyclically extending a Zadoff-Chu sequence based on the length. In one embodiment, the Zadoff-Chu sequence is cyclically extended based on the required DMRS length to generate the DMRS, for example. The length of the Zadoff-Chu is $N_{ZC}^{RS}$, which is the minimum prime number greater than $M_{sc}^{RS}$ that represents the required DMRS length. As another example, the length-29 Zadoff-Chu sequence may be cyclically extended to generate the length-30 DMRS sequence.

It is to be appreciated that in the case where the repetition factor is greater than 2, the required DMRS length may be changed. Therefore, the number of physical resource blocks is not an integral multiple of the number of terminal devices that share the physical resource blocks. For instance, when the repetition factor is equal to 3, the number of shared physical resource blocks may be 1, 2, 4, 5, and the like.

At 215, the DMRS is transmitted to the network device 140 on the subcarriers allocated to the terminal device 110 in the physical resource blocks. In one example embodiment, the terminal device 110 may transmit the DMRS to the network device 140 on a particular resource element of a particular symbol of the physical resource blocks.

The method 300 will be described below with reference to FIG. 3. As shown in FIG. 3, at 305, scheduling information is generated. The scheduling information at least indicating physical resource blocks shared by a plurality of terminal devices 110 and 120, and sub-carriers respectively allocated to the plurality of terminal devices 110 and 120 in the physical resource blocks. The number of physical resources blocks is not an integral multiple of the number of terminal devices 110 and 120 that share the physical resource blocks.

At 310, the scheduling information is transmitted to the plurality of terminal devices 110 and 120. Examples of the scheduling information have been described above and will not be repeated here.

At 315, a plurality of demodulation reference signals (DMRS) from the plurality of terminal devices 110 and 120 are received on the sub-carriers respectively allocated to the plurality of terminal devices 110 and 120 in the physical resource blocks, and lengths of the DMRSs are determined based on the number of physical resource blocks and the number of the plurality of terminal devices 110 and 120.

In some embodiments, the method 300 also comprises: determining the allocation of the sub-carriers in the physical resource blocks to enable the plurality of DMRSs from the plurality of terminal devices to form an interleaved signal. In one embodiment, the plurality of DMRS signals (for example, orthogonal) are multiplexed with the Interleaved Frequency Division Multiple Access (IFDMA) technology, for example. The formed interleaved signal is located on the subcarriers for the DMRSs of the terminal devices 110 and 120 respectively allocated to the terminal devices 110 and 120 in physical resource blocks.

In some embodiments, the method 300 also comprises: performing channel estimation for the plurality of terminal devices 110 and 120 based on the plurality of received DMRSs. In one embodiment, the network device 140 performs the channel estimation, for example, to determine parameters, such as channel fading, for the MU-MIMO communications.

It is to be understood that the operations implemented by the network device 140 and associated features described above with reference to FIG. 3 are also applicable to the method 200 implemented by the first terminal device 110 and have similar effects. The details will not be repeated here.

Figure 4:
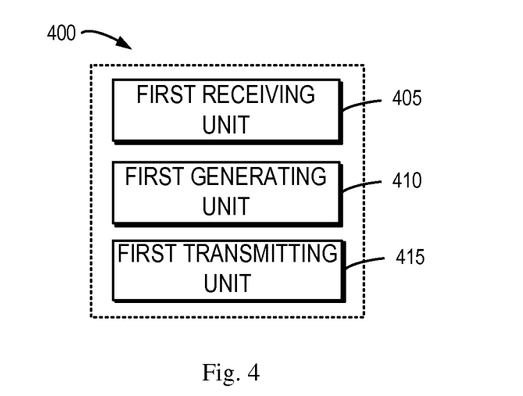
FIG. 4 illustrates a block diagram of an apparatus according to some embodiments of the present disclosure.

FIG. 4 shows a block diagram of an apparatus 400 according to some embodiments of the present disclosure. It is to be understood that the apparatus 400 can be implemented at a side of the first terminal device 110 as shown in FIG. 1. As shown, the apparatus 400 (for example, the first terminal device 110) comprises: a first receiving unit 405 configured to receive scheduling information from a network device, the scheduling information at least indicating physical resource blocks shared by a terminal device and at least one further terminal device, the number of physical resource blocks is not an integral multiple of the number of terminal devices that share the physical resource blocks; a first generating unit 410 configured to generate a demodulation reference signal (DMRS), a length of the DMRS being determined based on the number of physical resource blocks and the number of at least one further terminal device; and a first transmitting unit 415 configured to transmit the DMRS to the network device on sub-carriers allocated to the terminal device in the physical resource blocks.

In some embodiments, the apparatus 400 may also comprise a first determining unit configured to determine the number of sub-carriers associated with the physical resource blocks. In some embodiments, the apparatus 400 may also comprise a second determining unit configured to determine the length to be proportional to the number of the sub-carriers and the number of physical resource blocks and inversely proportional to the number of at least one further terminal device.

In some embodiments, the first generating unit 401 may comprise a second generating unit configured to truncate a Zadoff-Chu sequence based on the length to generate the DMRS.

In some embodiments, the first generating unit 410 may comprise a third generating unit configured to truncate a further DMRS based on the length and cyclically extending the truncated further DMRS to generate the DMRS.

In some embodiments, the first generating unit 410 may comprise a fourth generating unit configured to generate the DMRS by cyclically extending a Zadoff-Chu sequence based on the length.

Figure 5:
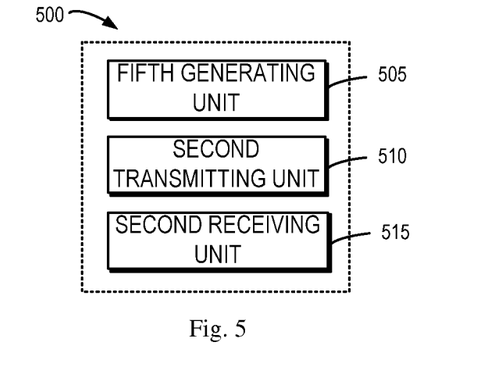
FIG. 5 illustrates a block diagram of an apparatus according to some other embodiments of the present disclosure.

FIG. 5 shows a block diagram of an apparatus 500 according to some embodiments of the present disclosure. It is to be understood that the apparatus 500 can be implemented at a side of the network device 140 as shown in FIG. 1. As shown in FIG. 5, the apparatus 500 (for example, the network device 140) comprises: a fifth generating unit 505 configured to generate scheduling information, the scheduling information at least indicates physical resource blocks shared by a plurality of terminal devices, and sub-carriers respectively allocated to the plurality of terminal devices in the physical resource blocks, the number of physical resource blocks being not an integral multiple of the number of terminal devices that share the physical resource blocks; a second transmitting unit 510 configured to transmit the scheduling information to the plurality of terminal devices; and a second receiving unit 515 configured to receive a plurality of demodulation reference signals (DMRSs) from the plurality of terminal devices on the sub-carriers respectively allocated to the plurality of terminal devices in the physical resource blocks, lengths of the DMRSs being determined based on the number of physical resource blocks and the number of the plurality of terminal devices.

In some embodiments, the apparatus 500 may comprise a third determining unit configured to determine allocation of sub-carriers in the physical resource blocks to enable the plurality of DMRSs from the plurality of terminal devices to form an interleaved signal.

In some embodiments, the apparatus 500 may also comprise an execution unit configured to perform channel estimation for the plurality of terminal devices based on the plurality of received DMRS.

The units shown in FIGS. 4 and 5 may be partially or fully implemented as hardware modules, software modules, firmware modules or any combinations thereof. In particular, in some embodiments, the above described flow, method or process may be implemented in hardware of the terminal device or the network device. For example, the terminal device or the network device may use their transmitters, receivers, transceivers, and/or processors or controllers to implement the methods 200 and 300.

Figure 6:
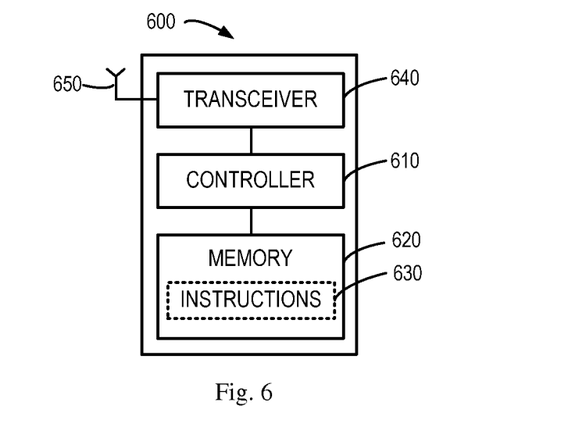
FIG. 6 illustrates a block diagram of a device according to some embodiments of the present disclosure.

FIG. 6 shows a block diagram of a device 600 suitable for implementing embodiments of the present disclosure. The device 600 can be used for implementing a terminal device, such as, the first terminal device 110 as shown in FIG. 1; and/or implementing a network device, such as, the network device 140 shown in FIG. 1.

As illustrated, the device 600 comprises a controller 610, which controls operations and functions of the device 600. In some embodiments, the controller 610 may perform various operations, for example, by means of instructions 630 stored in a memory 620 coupled to the controller 610. The memory 620 may be of any types suitable for local technology environments and may be implemented using any suitable data storage techniques, which includes, but is not limited to, a semiconductor based storage device, a magnetic storage device and system, and an optical storage device and system. Although FIG. 6 only illustrates one memory unit, the device 600 may comprise several physically distinct memory units.

The controller 610 may be of any types suitable for the local technology environments and may include, but not limited to, one or more of a general-purpose computer, a special purpose computer, a microcontroller, a digital signal processor (DSP), and a multi-core controller architecture based on controllers. The device may also comprise a plurality of controllers 610. The controllers 60 are coupled to the transceiver 640. The transceiver 640 may receive and transmit information via one or more antennas 650 and/or other components.

When the device 600 serves as the network device 140, the controller 610 and the transceiver 640 may cooperate to perform the method 300 as described above with reference to FIG. 3. When the device 600 serves as the first terminal device 110, the controller 610 and the transceiver 640 may cooperate to perform the method 200 as described above with reference to FIG. 2. In some embodiments, all acts related to data/information transmission and reception as described above may be performed by the transceiver 640, while other actions may be performed by the controller 610, for example. All of the features described with reference to FIGS. 2 and 3 are applicable to the device 600 and will not be repeated here.

Generally, various example embodiments of the present disclosure may be implemented in hardware, special purpose circuits, software, logic or any combinations thereof. Some aspects may be implemented in hardware while other aspects may be implemented in firmware or software executed by controllers, microprocessors or other computing devices. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

As an example, embodiments of the present disclosure may be described in the context of machine-executable instructions, which is included in program modules executed in devices on a target physical or virtual processor, for example. In general, program modules comprise routines, programs, libraries, objects, classes, components, data structures, and the like, that perform particular tasks or implement particular abstract data structures. The functionality of the program modules may be combined or split between program modules as desired in various embodiments. Machine-executable instructions for program modules may be executed within a local or distributed device. In a distributed device, program modules may be located in both local and remote storage media.

Computer program codes for carrying out methods of the present disclosure may be written in any combination of one or more programming languages. The computer program codes may be provided to a processor of a general-purpose computer, a special purpose computer or other programmable data processing apparatuses, such that the program codes, when executed by the computer or other programmable data processing apparatuses, cause the functions/operations specified in the flowcharts and/or block diagrams to be implemented. The program codes may be executed entirely on a machine, partly on the machine, as a standalone software package, partly on the machine and partly on a remote machine or entirely on the remote machine or server.

In the context of the present disclosure, a machine-readable medium may be any tangible medium that contains or stores programs for or related to an instruction executing system, apparatus or device. The machine-readable medium may be a machine-readable signal medium or a machine-readable storage medium and may include but not limited to an electronic, magnetic, optical, electromagnetic, infrared, or semiconductor system, apparatus or device, or any suitable combination thereof. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof.

Furthermore, although operations are depicted in a particular order, it is to be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

We claim:

1. A method for multiple input multiple output (MIMO) communications, comprising:
   receiving, at a terminal device, scheduling information from a network device, the scheduling information at least indicating physical resource blocks shared by a demodulation reference signal (DMRS) of the terminal device and a further DMRS of at least one further terminal device, and different sub-carriers allocated to the DMRS and the further DMRS in each of the physical resource blocks, wherein there is a number of the physical resource blocks and the number of the physical resource blocks is indivisible by a total number of the terminal device and the at least one further terminal device;
   generating the DMRS, a length of the DMRS being determined based on the number of the physical resource blocks and a number of the at least one further terminal device; and
   transmitting the DMRS to the network device on the sub-carriers allocated to the DMRS in the physical resource blocks.

2. The method of claim 1, further comprising:
   determining what number of sub-carriers are associated with the physical resource blocks, and
   determining the length to be proportional to the number of sub-carriers and the number of the physical resource blocks and inversely proportional to the total number of the terminal device and the at least one further terminal device.

3. The method of claim 1, wherein generating the DMRS comprises:
   generating the DMRS by truncating a Zadoff-Chu sequence or a DMRS of a further length based on the length.

4. The method of claim 1, wherein generating the DMRS comprises:
   generating the DMRS by truncating a further DMRS of a further length based on the length and cyclically extending the truncated DMRS of the further length.

5. The method of claim 1, wherein generating the DMRS comprises:
   generating the DMRS by cyclically extending a Zadoff-Chu sequence or a DMRS of a further length based on the length.

6. A method for multiple input multiple output (MIMO) communications, comprising:
   generating scheduling information, the scheduling information at least indicating physical resource blocks shared by a plurality of demodulation reference signals (DMRSs) of a plurality of terminal devices, and different sub-carriers allocated to the plurality of DMRSs in each of the physical resource blocks, wherein there is a number of the physical resource blocks and the number of the physical resource blocks is indivisible by a total number of the plurality of terminal devices;
   transmitting the scheduling information to the plurality of terminal devices; and
   receiving the plurality of DMRSs from the plurality of terminal devices on the sub-carriers respectively allocated to the plurality of DMRSs in the physical resource blocks, lengths of the DMRSs being determined based on the number of the physical resource blocks and the number of the plurality of terminal devices.

7. The method of claim 6, further comprising:
   determining allocation of the sub-carriers in the physical resource blocks to enable the plurality of DMRSs from the plurality of terminal devices to form an interleaved signal.

8. The method of claim 6, further comprising:
   performing channel estimation for the plurality of terminal devices based on the plurality of received DMRSs.

9. A terminal device, comprising:
   a transceiver configured to receive scheduling information from a network device, the scheduling information at least indicating physical resource blocks shared by a demodulation reference signal (DMRS) of the terminal device and a further DMRS of at least one further terminal device, and different sub-carriers allocated to the DMRS and the further DMRS in each of the physical resource blocks, wherein there is a number of the physical resource blocks and the number of the physical resource blocks is indivisible by a total number of the terminal device and the at least one further terminal device;
   a controller configured to generate the DMRS, a length of the DMRS being determined by the number of the physical resource blocks and a number of the at least one further terminal device; and the transceiver being further configured to transmit the DMRS to the network device on the sub-carriers allocated to the DMRS in the physical resource blocks.

10. The terminal device of claim 9, wherein the controller is further configured to:

determine what number of sub-carriers are associated with the physical resource blocks, and determine the length to be proportional to the number of sub-carriers and the number of the physical resource blocks and inversely proportional to the total number of the terminal device and the at least one further terminal device.

11. The terminal device of claim 9, wherein the controller is further configured to:

generate the DMRS by truncating a Zadoff-Chu sequence or a DMRS of a further length based on the length.

12. The terminal device of claim 9, wherein the controller is further configured to:

generate the DMRS by truncating a further DMRS of a further length based on the length and cyclically extending the truncated DMRS of the further length.

13. The terminal device of claim 9, wherein the controller is further configured to:

generate the DMRS by cyclically extending a Zadoff-Chu sequence or a DMRS of a further length based on the length.

14. A network device, comprising:

a controller configured to generate scheduling information, the scheduling information at least indicating physical resource blocks shared by a plurality of demodulation reference signals (DMRSs) of a plurality of terminal devices, and different sub-carriers allocated to the plurality of DMRSs in each of the physical resource block, wherein there is a number of the physical resource blocks and the number of the physical resource blocks is indivisible by a total number of the plurality of terminal devices;

a transceiver configured to:

transmit the scheduling information to the plurality of terminal devices; and receive the plurality of DMRSs from the plurality of terminal devices on the sub-carriers respectively allocated to the plurality of DMRSs in the physical resource blocks, lengths of the DMRSs being determined based on the number of the physical resource blocks and the number of the plurality of terminal devices.

15. The network device of claim 14, wherein the controller is further configured to:

determine allocation of the sub-carriers in the physical resource blocks to enable the plurality of DMRSs from the plurality of terminal devices to form an interleaved signal.

* * * * *